US009084452B2

(12) United States Patent
Blackman et al.

(10) Patent No.: US 9,084,452 B2
(45) Date of Patent: Jul. 21, 2015

(54) WATER ACTIVATED RESTRAINT RELEASE SYSTEM

(71) Applicant: Carleton Technologies, Inc., Orchard Park, NY (US)

(72) Inventors: Donald Blackman, Bradenton, FL (US); Brian Ford, Seminole, FL (US); Tom Yandle, Palmetto, FL (US)

(73) Assignee: Carleton Technologies, Inc., Orchard Park, NY (US)

( * ) Notice: Subject to any disclaimer, the term of this patent is extended or adjusted under 35 U.S.C. 154(b) by 221 days.

(21) Appl. No.: 13/960,211

(22) Filed: Aug. 6, 2013

(65) Prior Publication Data

US 2014/0047682 A1    Feb. 20, 2014

Related U.S. Application Data

(60) Provisional application No. 61/679,929, filed on Aug. 6, 2012.

(51) Int. Cl.
| A44B 11/25 | (2006.01) |
| B60R 22/32 | (2006.01) |
| B60R 21/00 | (2006.01) |

(52) U.S. Cl.
CPC ......... *A44B 11/2569* (2013.01); *A44B 11/2526* (2013.01); *B60R 22/322* (2013.01); *B60R 2021/0016* (2013.01); *Y10T 24/45461* (2015.01); *Y10T 24/45644* (2015.01)

(58) Field of Classification Search
CPC ........... A44B 11/2569; A44B 11/2573; A44B 11/2526; B60R 22/322; B60R 2021/0016; Y10T 24/45461; Y10T 24/4501

USPC .................................................. 24/602, 643
See application file for complete search history.

(56) References Cited

U.S. PATENT DOCUMENTS

| 2,892,232 A | 8/1959 | Miller et al. |
| 2,899,732 A | 8/1959 | Cushman |
| 3,228,080 A | 1/1966 | Trauger |
| 3,564,672 A | 2/1971 | McIntyre |
| 3,639,948 A | 2/1972 | Sherman |
| 3,747,167 A | 7/1973 | Pravaz |
| 4,014,080 A | 3/1977 | Caradec |
| 4,441,236 A | 4/1984 | Bron |
| 4,610,058 A | 9/1986 | Stemmildt et al. |
| 4,656,700 A | 4/1987 | Tanaka et al. |
| 4,742,604 A | 5/1988 | Mazelsky |
| 5,857,246 A | 1/1999 | Becnel |
| 7,065,843 B1 | 6/2006 | Wu |
| 7,716,794 B2 | 5/2010 | Wu |
| 2013/0212845 A1 | 8/2013 | Ford et al. |

FOREIGN PATENT DOCUMENTS

| FR | 1298012 A | 7/1962 |
| GB | 1582973 A | 1/1981 |

*Primary Examiner* — Abigail Morrell
(74) *Attorney, Agent, or Firm* — Jaeckle Fleischmann & Mugel, LLP

(57) ABSTRACT

A water activated restraint release that is designed to be retrofitted onto an existing restraint system. The water activated restraint release includes a buckle and a tang to be secured to the buckle. The buckle includes a release mechanism and an actuator assembly. The actuator assembly causes the release mechanism to release the tang in the presence of water, thereby releasing a passenger.

11 Claims, 13 Drawing Sheets

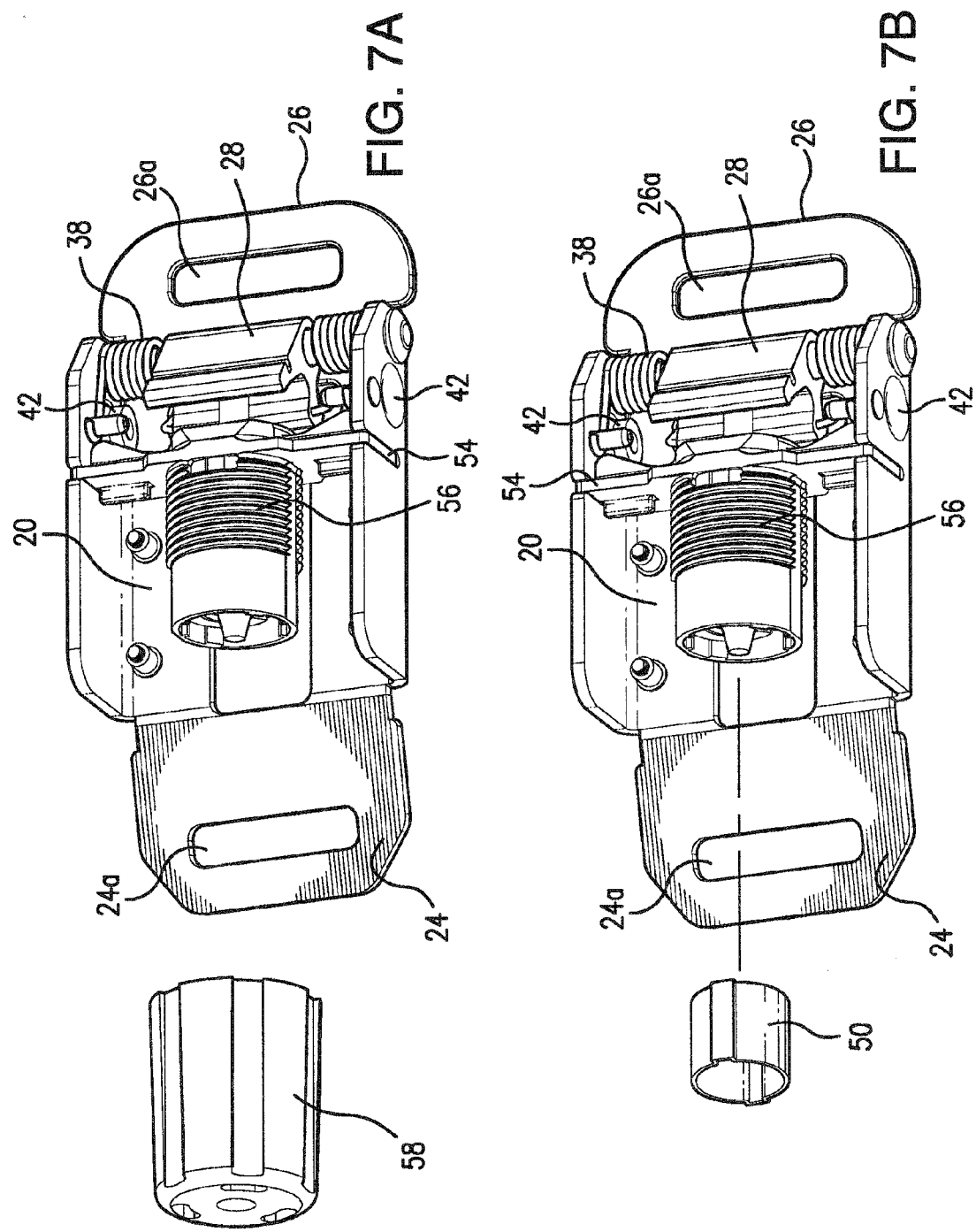

WATER ACTIVATED RESTRAINT RELEASE SYSTEM

CROSS REFERENCE TO RELATED APPLICATIONS

This application claims priority to application Ser. No. 61/679,929 filed on Aug. 6, 2012 and entitled Water Activated Restraint Release System. The contents of this application are incorporated herein for all purposes.

BACKGROUND OF THE INVENTION

1. Field of the Invention

The present disclosure relates to a restraint release. More particularly, the disclosure relates to a restraint release that secures an occupant during normal vehicle movements but that automatically releases the occupant upon being submerged in water.

2. Description of the Background Art

A wide variety of passive restraint systems are in use today. Passive restraints are designed to restrain a passenger's upper and lower body in the event of an accident. Passive restraints are widely utilized in both land and air based vehicles. Passive restraints typically include a lap and shoulder belt. These belts can be formed either as single or separate webbings. At the end of the webbing a male tang is secured. The tang is adapted to be releasably secured within a female buckle. The passenger is secured by inserting the tang into to a buckle. A mechanism, such as a push button or lever, can thereafter be accessed to release the restraint.

A dilemma underscores the design of all restraint systems. The restraint must be robust enough to withstand the shocks and impacts associated with vehicle accidents and thereby avoid the unintended release of the restraint. However, the restraint must not be so robust as to preclude passenger egress following an accident. Although a passenger must be properly restrained during an accident, following the accident the passenger must be able to quickly and easily access the release mechanism associated with the restraint.

This design dilemma is heightened in the event of water related accidents. When an automobile, airplane, or helicopter crashes into a body of water, there is a critical need to ensure that the passengers are properly restrained. However, once the forces associated with the accident have subsided, there is typically a small window of time in which the passengers must release themselves from the restraint and exit the vehicle. The inability of a passenger to egress from a vehicle following an accident upon entering the water has resulted in fatal consequences.

SUMMARY OF THE INVENTION

One of the advantages of the present release system is the ability to restrain a passenger during an accident but permit the passenger to be quickly released in the event of a water related accident.

Another advantage is achieved by providing a release system that incorporates a water sensor into a buckle release mechanism, whereby the buckle is automatically released when submerged in water.

A further advantage is realized by providing a release system that is automatically released when submerged in water and that can be retrofitted onto existing restraint systems.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 7A is a perspective view of the restraint release showing the actuator cap being removed.

FIG. 7B is a perspective view of the restraint release showing the actuator cap removed and the bobbin being replaced.

Similar reference numerals refer to similar parts through the several views of the drawings.

| | Parts List |
|---|---|
| 10 | System |
| 20 | First Buckle |
| 22 | Second (Conventional) Buckle |
| 22a | Pivotal Latch for Second Buckle |
| 24 | Fixed Tang |
| 24a | Locking Aperture of Fixed Tang |
| 26 | Releasable Tang |
| 26a | First Locking Aperture |

-continued

Parts List

| | |
|---|---|
| 26b | Second Locking Aperture |
| 28 | Locking Pawl |
| 30 | Release Mechanism |
| 32 | Upper Arm of Locking Pawl |
| 34 | Lower Tooth of Locking Pawl |
| 36 | Pawl Axle |
| 38 | Torsion Spring |
| 40 | Actuator Assembly |
| 42 | Alignment Guides |
| 44 | Compression Spring |
| 46 | Actuator Pin |
| 47 | Housing for Spring |
| 48 | Pusher Pin |
| 50 | Bobbin |
| 51 | Bobbin Shroud |
| 51a | Drainage Apertures |
| 52 | Bobbin Fingers |
| 53 | Bobbin Pill |
| 54 | Bobbin Holder |
| 56 | Bobbin Housing |
| 58 | Actuator Cap |
| 62 | Manual Release Aperture |
| 64 | Indicator |
| 66 | Indicator Window |
| 100 | Alternative Embodiment |
| 110 | Belt Connector |
| 110a | Locking Aperture |
| 120 | Belt Adjuster |
| 130 | Pawl |
| 140 | Lever |
| 150 | Spring |
| 152 | Binding Post |
| 154 | Bobbin Assembly |
| 156 | Housing |
| 158 | Fingers |
| 160 | Pill |
| 162 | Pusher Bar |
| 164 | Housing |

DETAILED DESCRIPTION OF THE PREFERRED EMBODIMENT

This disclosure relates to a restraint system for securing an occupant during vehicle movements or crashes, but that automatically releases the occupant if the restraint system becomes submerged in water. The system includes a buckle with opposing tangs. One of the tangs is adapted to be releasably coupled to a conventional buckle. The other tang is coupled to the vehicle restraint but is design to be released when the system becomes submerged. The system can be retrofitted into the existing restraints of a variety of land, air, and sea based vehicles and thereby provide a means of egress in water based crashes. The details of the present invention, and the manner in which they interrelate, are described in greater detail hereinafter.

Interlocking Buckles

Figure 1:
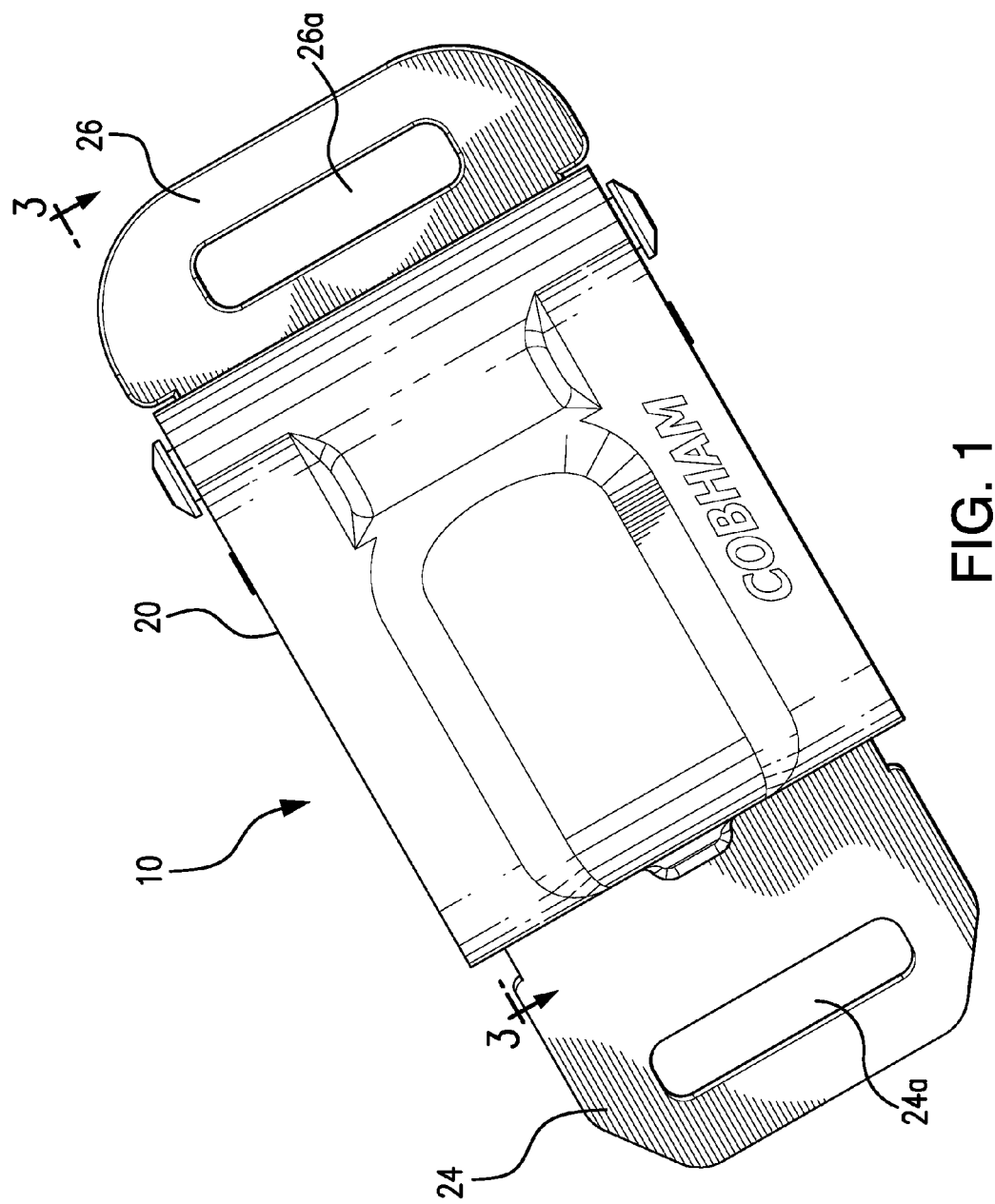
FIG. 1 is a perspective view of the restraint release device of the present disclosure.
Figure 2:
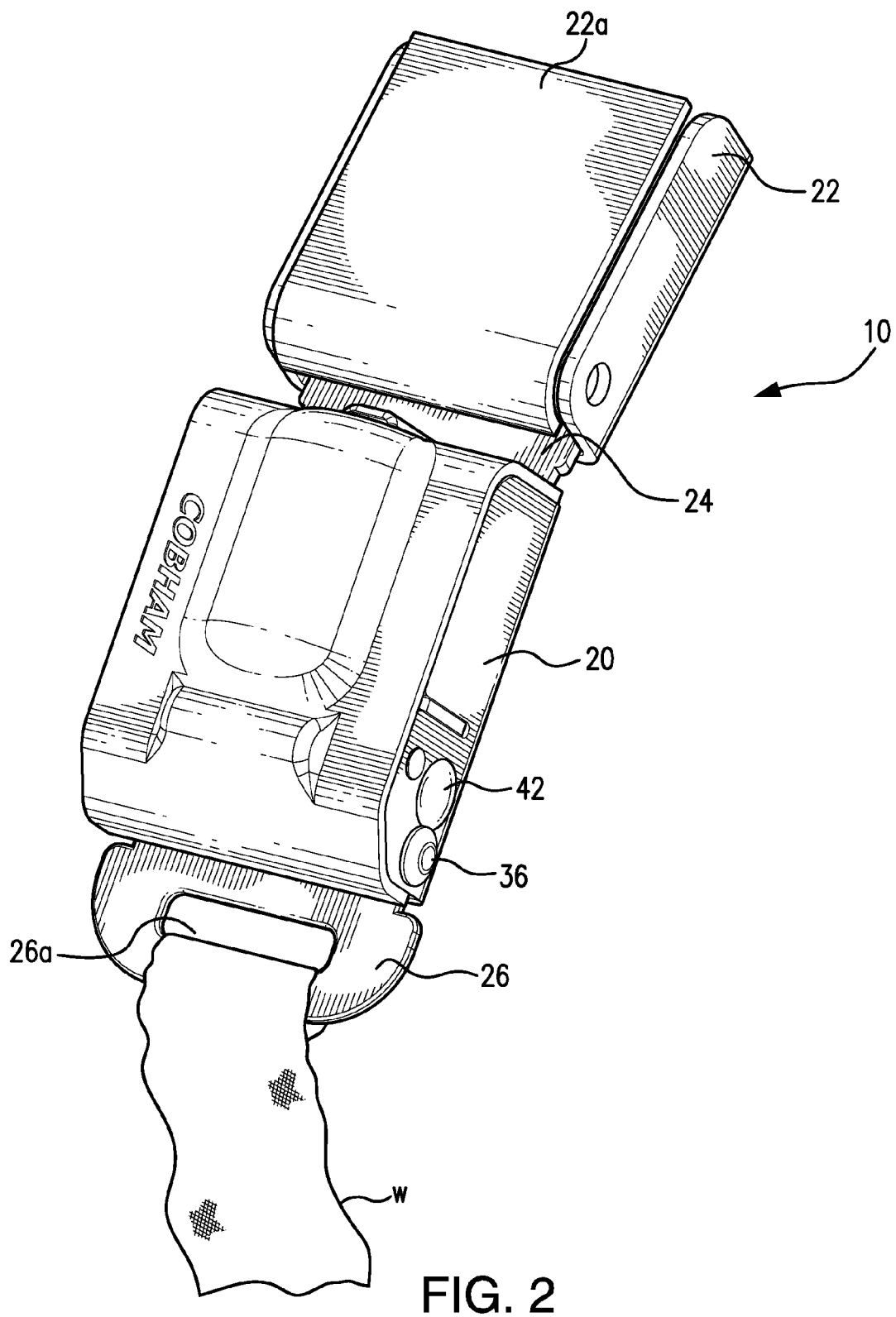
FIG. 2 is a perspective view of the restraint release device coupled to a conventional buckle assembly.

The system 10 of the present invention utilizes first and second interlocking buckles (20 and 22). As described hereinafter, first buckle 20 includes both a fixed tang 24 and a releasable tang 26. Fixed tang 24 is adapted to be releasably secured within buckle 22. Buckle 22 houses a locking pawl that engages a locking aperture 24a within fixed tang 24. Buckle 22 and its locking pawl have a conventional construction. FIG. 1 depicts the first buckle 20 removed from the conventional buckle 22. FIG. 2 illustrates the first and second buckles (20 and 22) interconnected by way of the fixed tang 24. More specifically, the fixed tang 24 is integrally secured to the rearward end of the first buckle 20. Fixed tang 24 can be received within a female receptacle within the conventional buckle 22. Once inserted, the locking pawl within buckle 22 can engage the locking aperture 24a to keep buckles 20 and 22 lockingly engaged with one another. Buckle 22 also includes a pivotal latch 22a that can be raised to release locking pawl from aperture 24a and thereby permit fixed tang 24 to be released. Again, buckle 22 and its locking pawl and pivotal latch 22a are of a well-known construction, the operation and construction of which will be readily understood by those of ordinary skill in the art.

Release Mechanism

Figure 3:
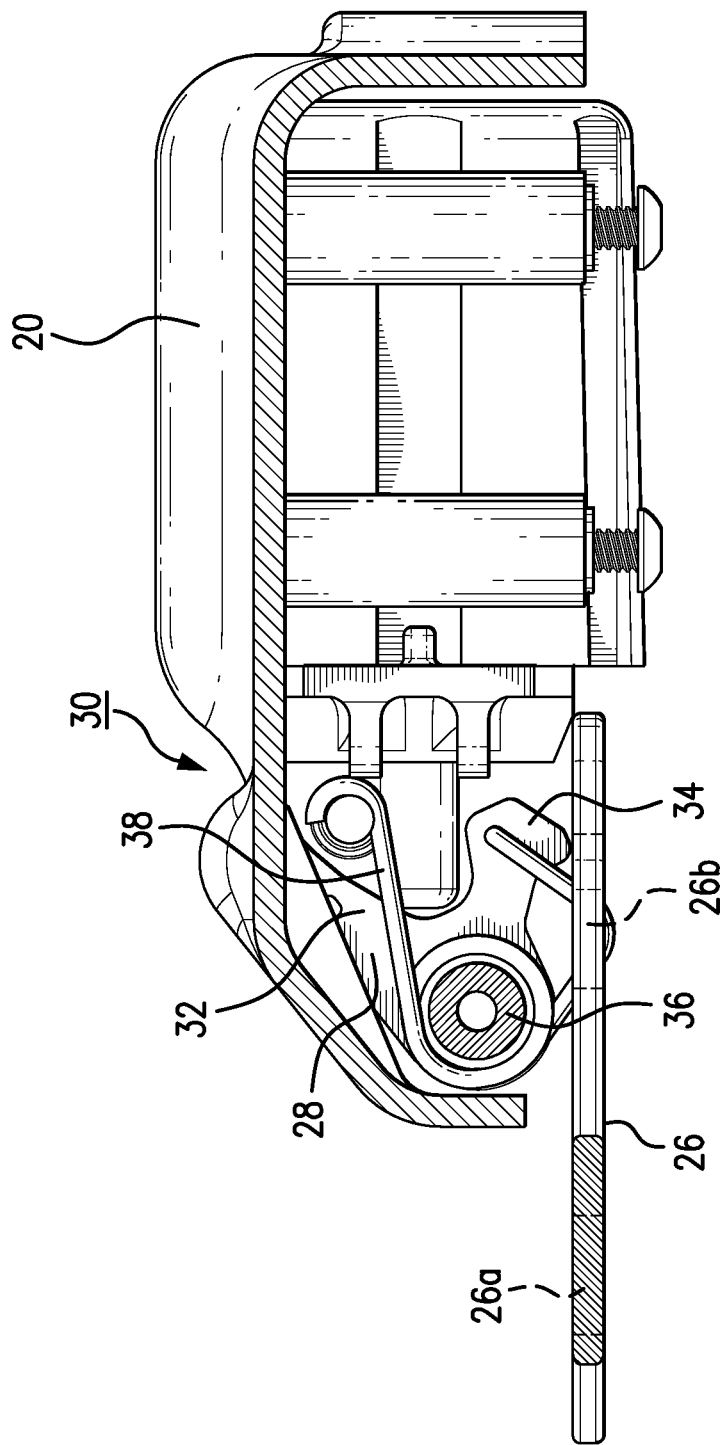
FIG. 3 is a cross sectional view of the restraint release device of the present disclosure.
Figure 4:
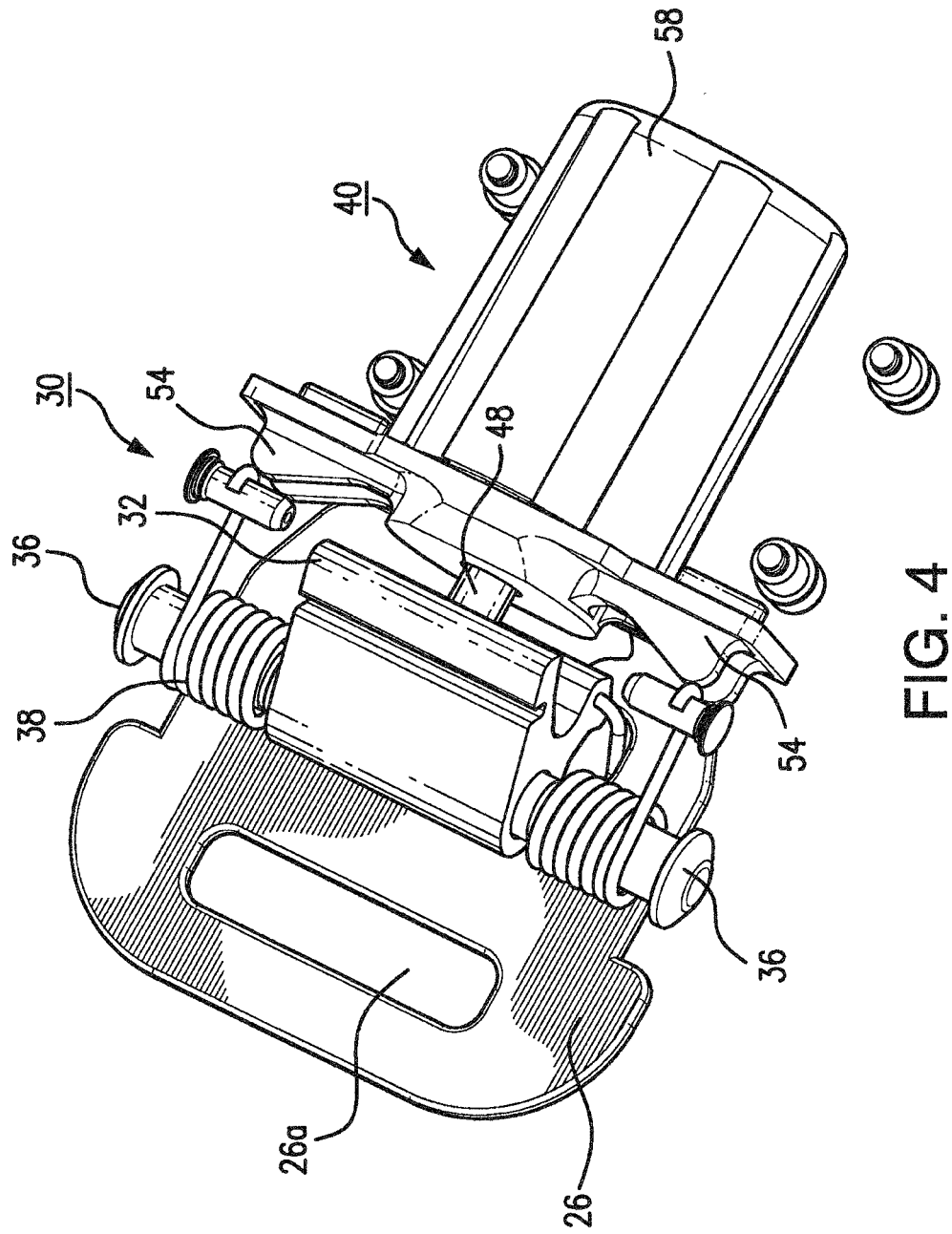
FIG. 4 is a cross sectional view of the restraint release device of the present disclosure.
Figure 5A:
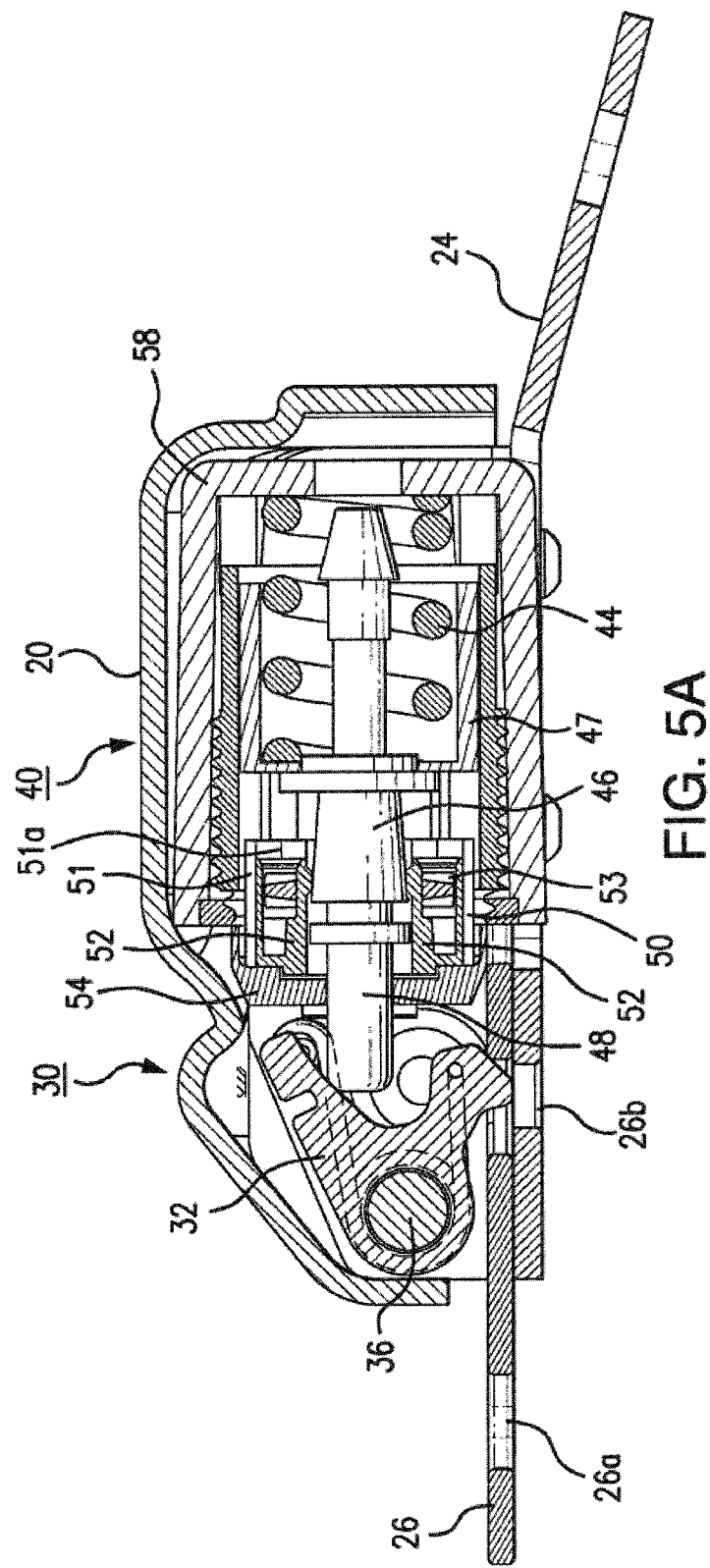
FIG. 5A is a cross sectional view of the restraint release device receiving the tang from an existing restraint.
Figure 5B:
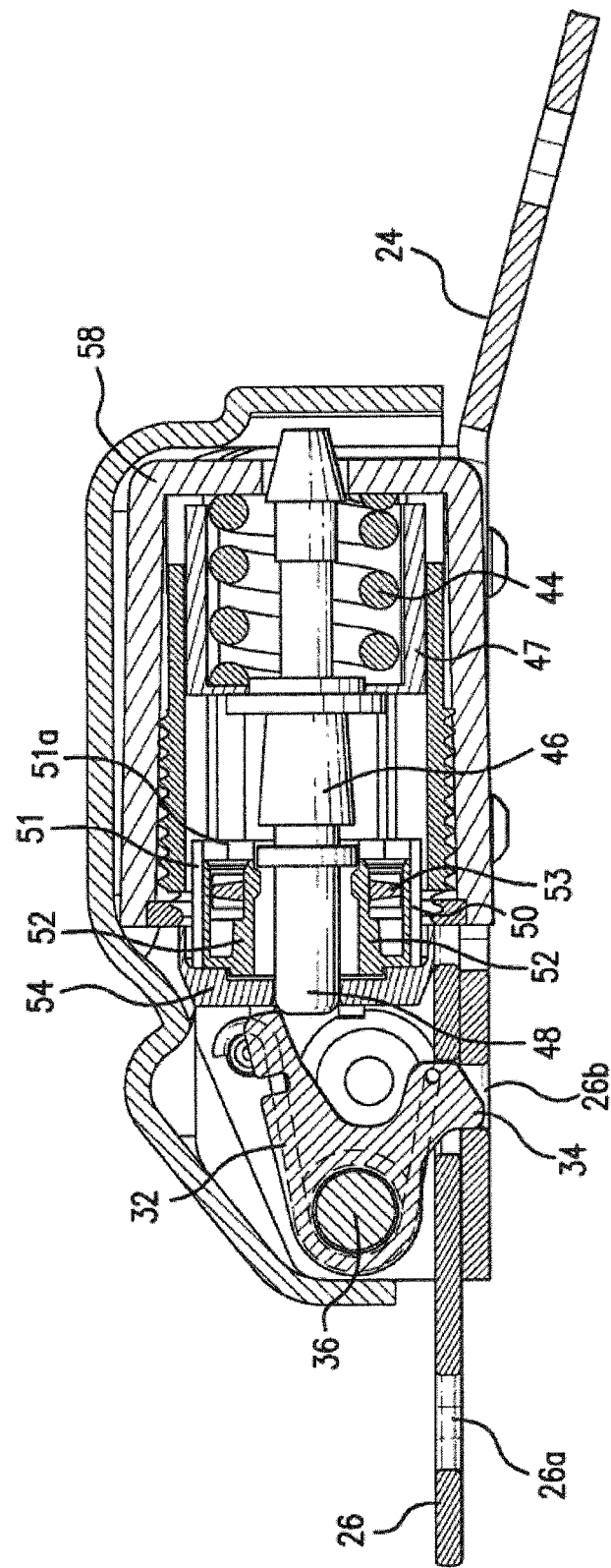
FIG. 5B is a cross sectional view of the restraint release in the locked orientation.
Figure 5C:
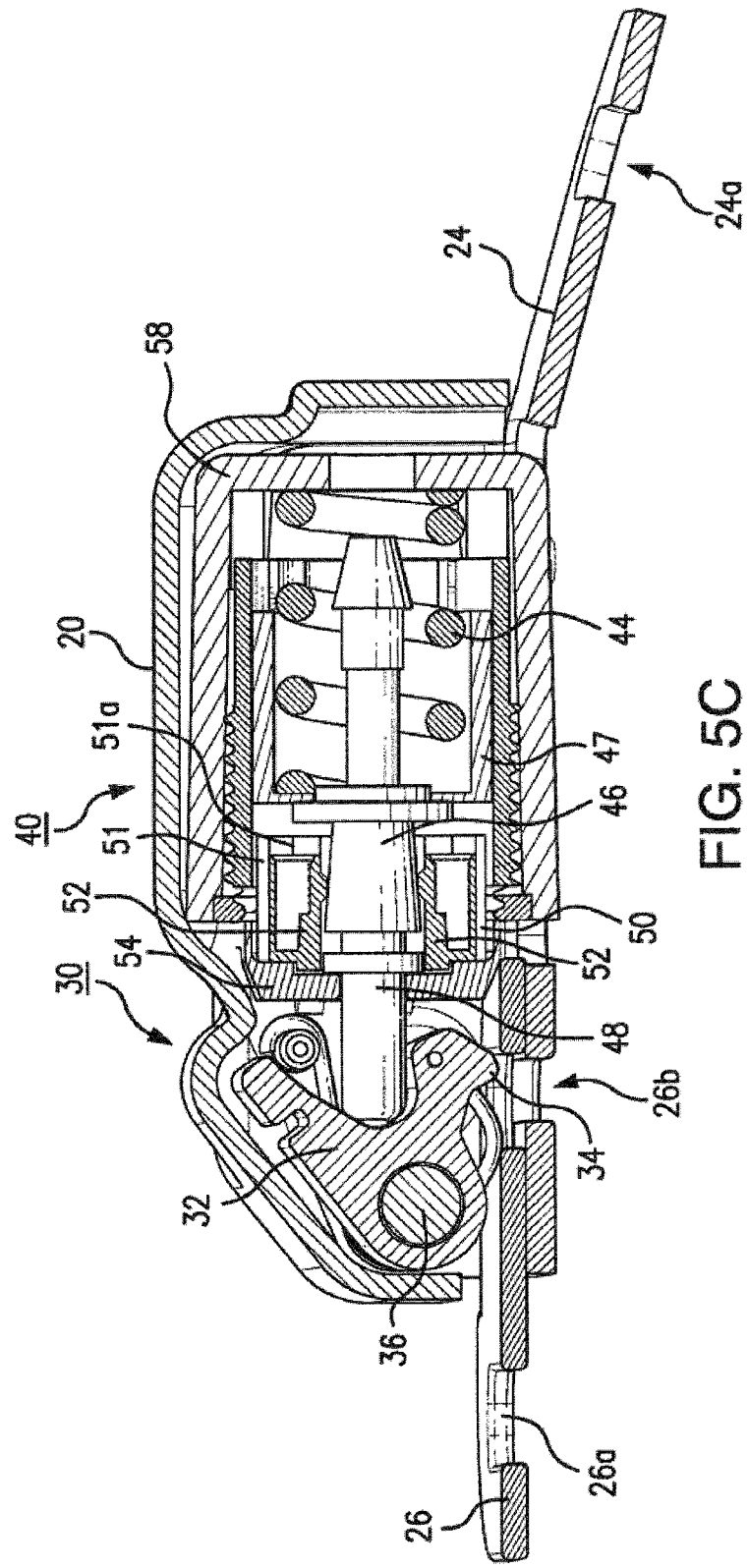
FIG. 5C is a cross sectional view of the restraint release in the unlocked orientation.

System 10 further includes a release mechanism 30 that is positioned within first buckle 20 and that permits the restraint of system 10 to be released without the user having to lift pivotal latch 22a or otherwise having to perform any manual actions. Release mechanism 30 operates by automatically ejecting releasable tang 26 from the first buckle 20 whenever system 10 becomes submerged. Each end of releasable tang 26 includes a locking aperture. The first locking aperture 26a can be secured to the webbing W that forms part of the occupant restraint. The second locking aperture 26b is received within an opening within mechanism 30. This opening is opposite of fixed tang 24. As noted in FIG. 3, a locking pawl 28 engages the second locking aperture 26b when releasable tang 26 is inserted into buckle 20. Pawl 28 is positioned within release mechanism 30 and includes an upper pawl arm 32 and a lower pawl tooth 34. Arm 32 and tooth 34 rotate about a pawl axle 36 that extends between the two sides of buckle 20. A torsion spring 38 is wound about the outer extent of axle 36. Arm 32 includes a channel for receiving an end of torsion spring 38 to, thereby, bias pawl 28 into a locked position. In the locked position, tooth 34 is positioned within the second locking aperture 26b such that tang 26 remains locked within buckle 20. FIG. 5B shows tooth 34 in the locked position within tang 26. FIG. 5C shows tooth 34 in the unlocked position to permit the removal of tang 26.

As tang 26 is initially inserted into mechanism, its leading edge pushes tooth 34 into the unlocked position and rotates pawl 28. Once tang 26 is fully positioned within mechanism 30, torsion spring 38 rotates pawl 28 in the opposite direction such that tooth 34 is positioned within locking aperture 26b and thereby locks tang 26 in position. Inwardly directed alignment guides 42 are formed on either side of the housing of release mechanism 30. Alignment guides 42 (note FIGS. 7A and 7B) limit the upward or downward movement of tang 26 when in the locked position. Once tang 26 is locked in position, it cannot be removed unless system 10 is immersed within water or service personnel remove it.

Actuator Assembly

Buckle 20 also houses an actuator assembly 40 for use in triggering the release mechanism 30 in the presence of water. Actuator assembly 40 includes a compression spring 44, and actuator pin 46, and a pusher pin 48. Furthermore, a housing 47 surrounds compression spring 44. Actuator pin 46 may include a circular bushing to permit to spring 44 to act upon the actuator pin 46 and housing 47. When spring 44 is released, housing 47 and actuator pin 46 are driven forward such that pusher pin 48 engages and rotates pawl arm 32. As pawl arm 32 rotates, pawl tooth 34 is removed from the second locking aperture 26b to, thereby, allow releasable tang 26 to be removed from mechanism 30. Alternatively, when spring 44 is compressed (note FIG. 5B), pusher pin 48 contacts but does not rotate pawl arm 32. Thus, when spring 44 is compressed, tooth 34 remains engaged with aperture 26b to thereby secure tang 26 within mechanism 30. This is the locked and un-actuated configuration.

Actuator assembly 40 further includes a collapsible bobbin 50, which controls the operation of spring 44. Bobbin 50 can be any of a variety of supports that collapse in the presence of water. As illustrated, bobbin 50 is initially mounted about both the actuator pin 46 and pusher pin 48. When dry, bobbin 50 acts as a retainer and prevents actuator pin 46 from moving forward. This, in turn, prevents spring 44 from releasing. However, if bobbin 50 contacts water, it degrades and collapses, which in turn, permits actuator 46 to enter the housing under the force of spring 44. This results in pusher pin 48 rotating pawl 28 to thereby release tang 26. Bobbin 50 is preferably held in position via a bobbin holder 54 and outer bobbin housing 56. Pusher pin 48 extends through an aperture in the bobbin holder 54. An actuator cap 58, in turn, is positioned over both the holder and housing (54 and 56). Bobbin 50 is preferably a V85000 model bobbin from Halkey-Roberts of St. Petersburg, Fla., which is described in U.S. Pat. No. 7,572,161. The '161 patent is incorporated herein by reference.

The preferred bobbin 50 is next described in more detail in connection with FIGS. 5A-5C. Namely, bobbin 50 includes a number of bobbin fingers 52 that extend about the inner circumference of bobbin 50. Fingers 52 are initially supported by a dissolvable pill 53 that extends between fingers 52 and the inner surface of the bobbin housing. With pill 53 intact and un-dissolved, fingers 52 create a seat upon which actuator pin 46 rests. However, pill 53 dissolves upon contacting water. Once dissolved, fingers 52 expand outwardly toward the outer periphery of bobbin 50. This, in turn, allows spring 44 to expand and force actuator pin 46 into the interior of bobbin 50. As illustrated in FIG. 5C, this allows pusher pin 48 to rotate pawl 28 and unlock tang 26. Bobbin 50 also includes an outer protective shroud 51. One or more drainage apertures 51a are included within shroud 51. These drainage apertures 51a control the flow of water into bobbin 50. These apertures prevent the unintended actuation of the device. Namely, a small amount of fluid will be insufficient to trigger bobbin 50. However, if the device is completely submerged, water enters into shroud 51 via apertures 51a to trigger bobbin 50 and release tang 26. The speed with which bobbin 50 is triggered can be effectively controlled by altering the number, size, and location of apertures 51a.

Spring 44, pawl 32, pusher pin 48, actuator pin 46, and torsion spring 38 are ideally sized and dimensioned to allow tang 26 to be released while under load. This can also be accomplished by varying the tension of spring 38 and coating the parts with a nickel-Teflon® coating. In the event the occupant is inverted or inclined following an accident, the webbing "W" may encounter significant loads. It is important that upon release mechanism 30 being triggered, that tang 26 have the capacity to be successfully ejected from buckle 20 even under such loads. The dimensions, spring tensions, and coatings are selected to accomplish this result.

Figure 6A:
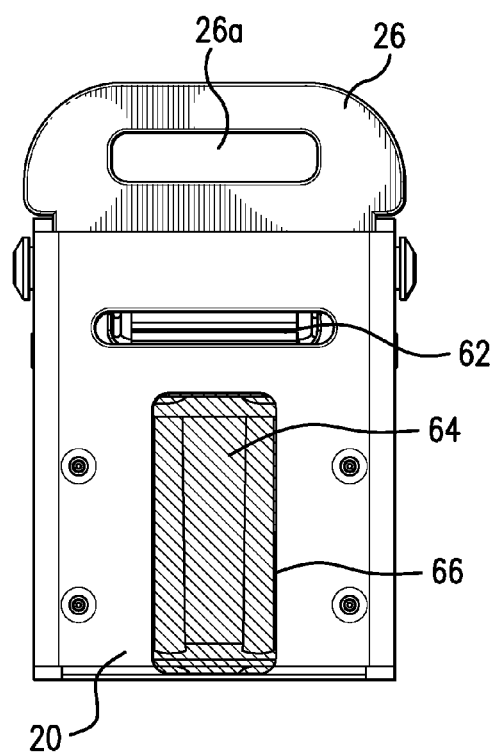
FIG. 6A is a bottom plan view of the restraint release in the armed configuration.
Figure 6B:
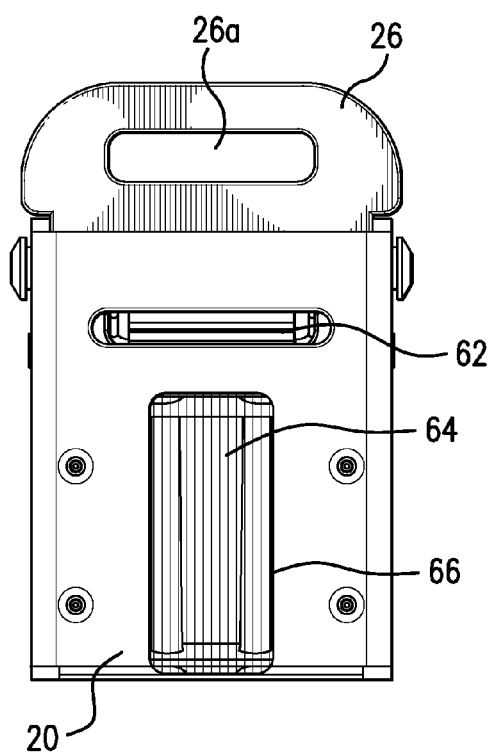
FIG. 6B is a bottom plan view of the restraint release after being fired.
Figure 8:
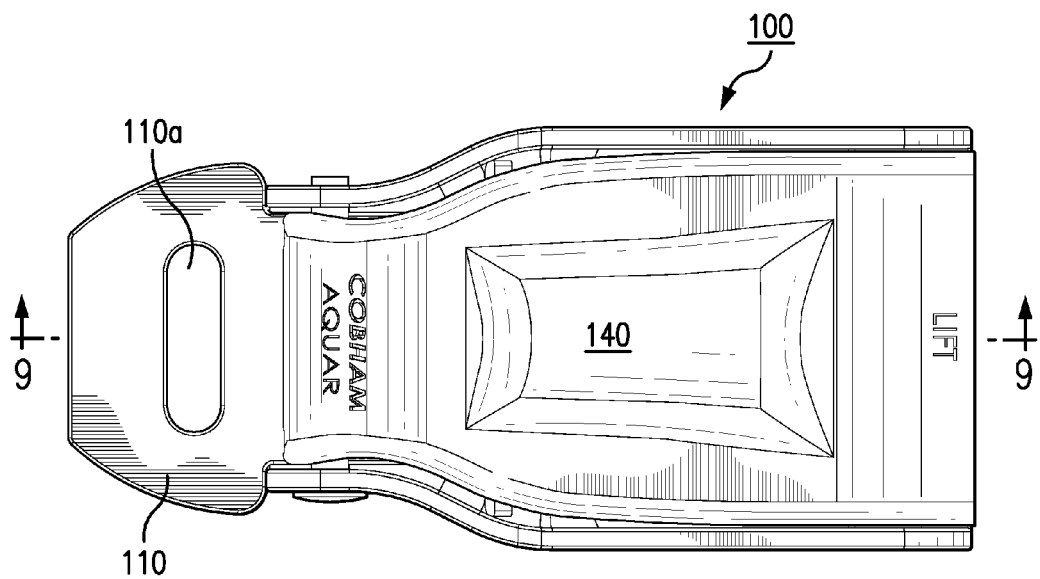
FIG. 8 is a top plan view of an alternative embodiment of the present invention.
Figure 9:
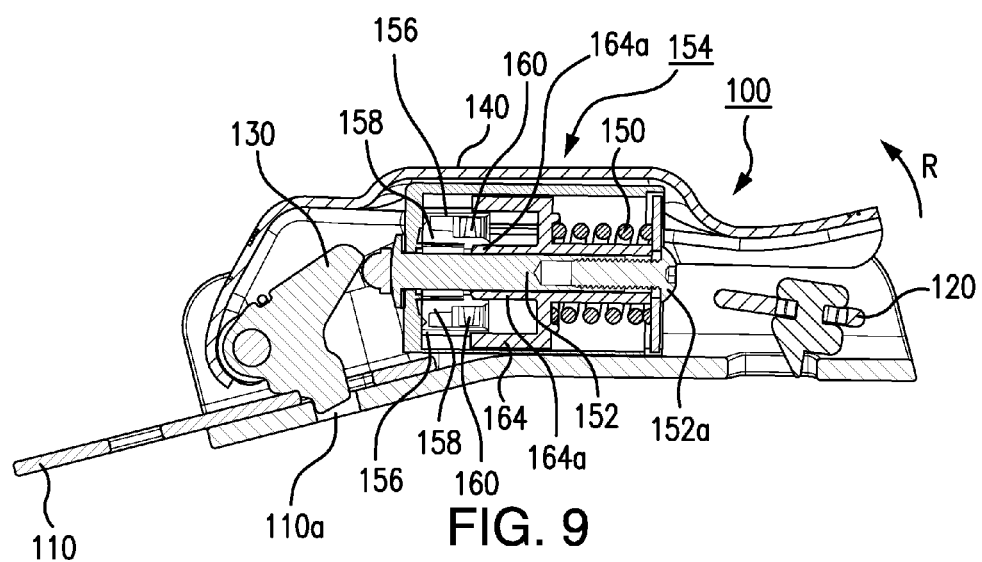
FIG. 9 is a cross sectional view taken along line 9-9 of FIG. 8.
Figure 10:
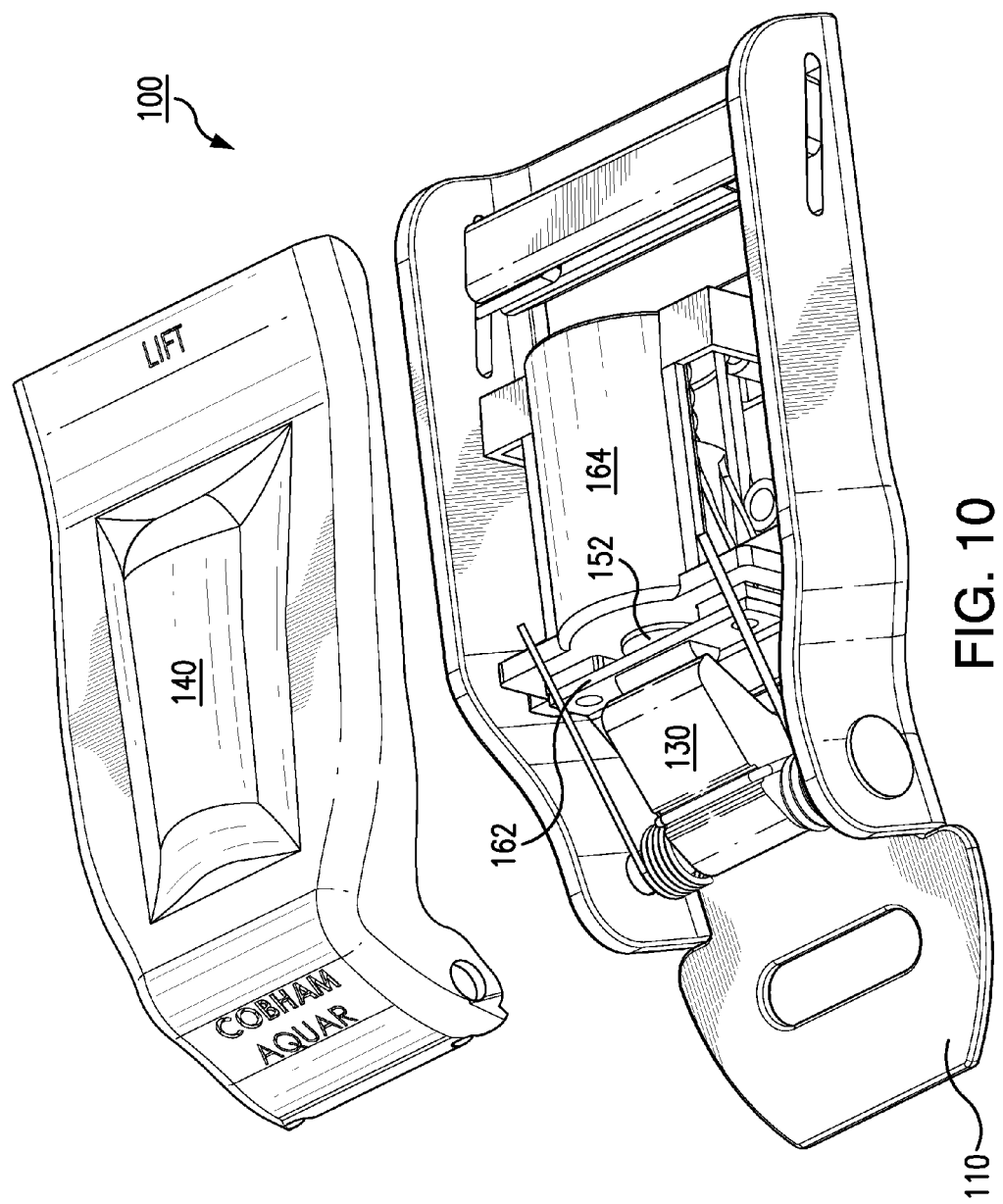
FIG. 10 is a perspective view of the alternative embodiment with the upper cover removed.
Figure 11:
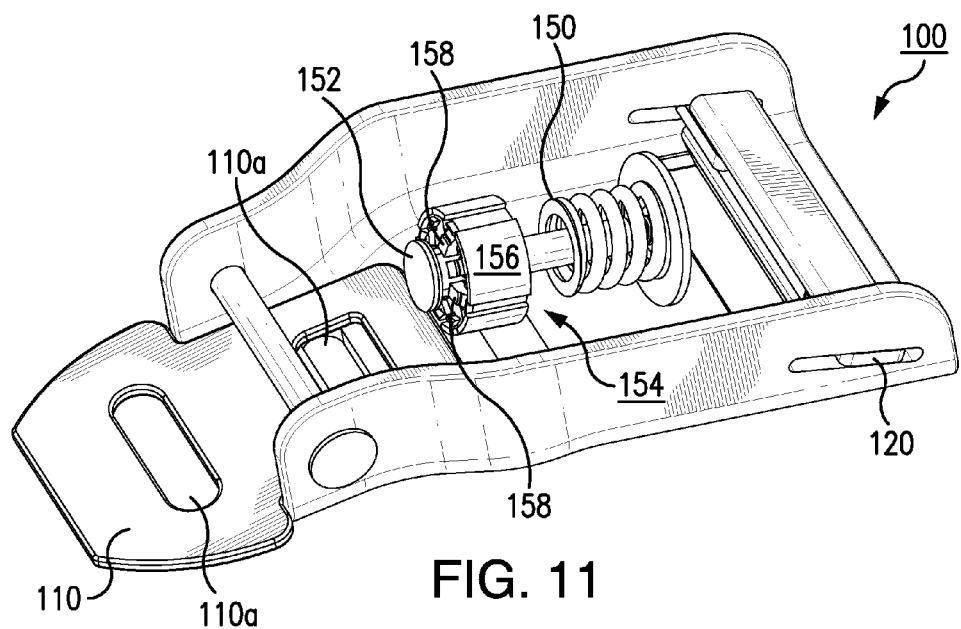
FIG. 11 is a perspective view with the release mechanism removed and showing the bobbin assembly.
Figure 12:
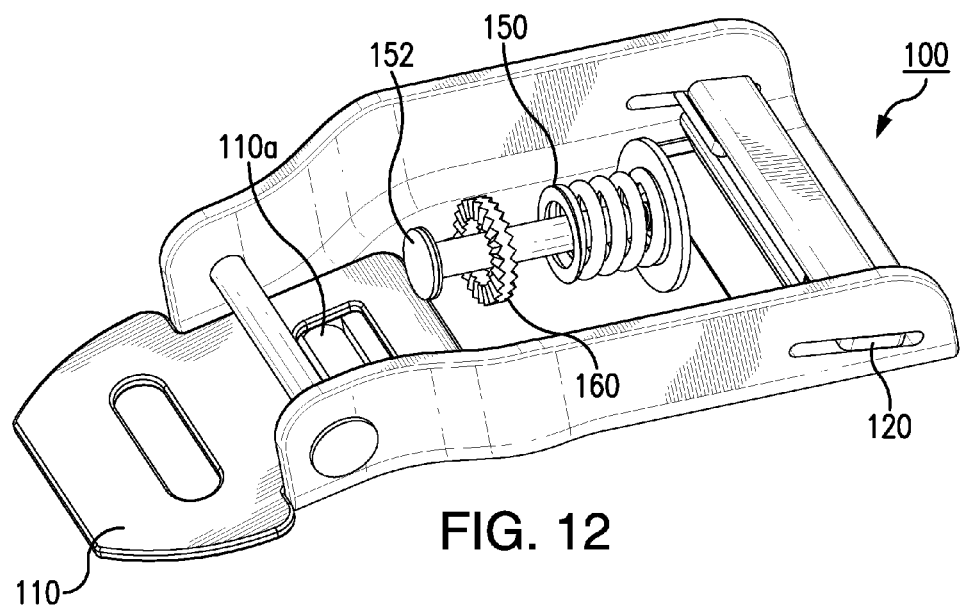
FIG. 12 is a perspective view with the release mechanism removed and showing the dissolvable pill.
Figure 13:
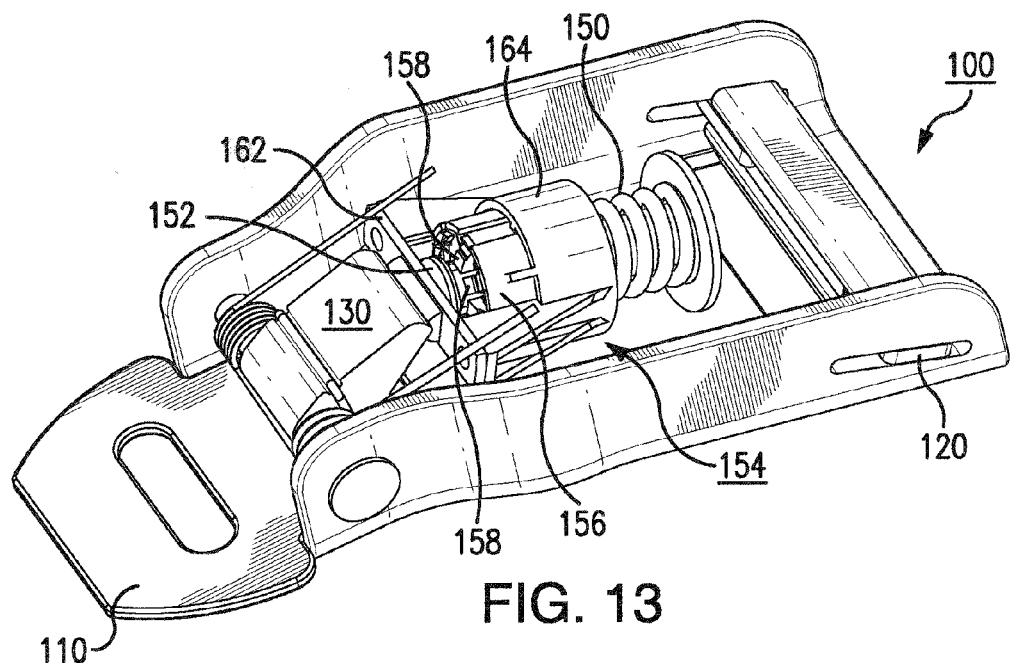
FIG. 13 is a perspective view depicting the release mechanism and the actuator assembly.
Figure 14:
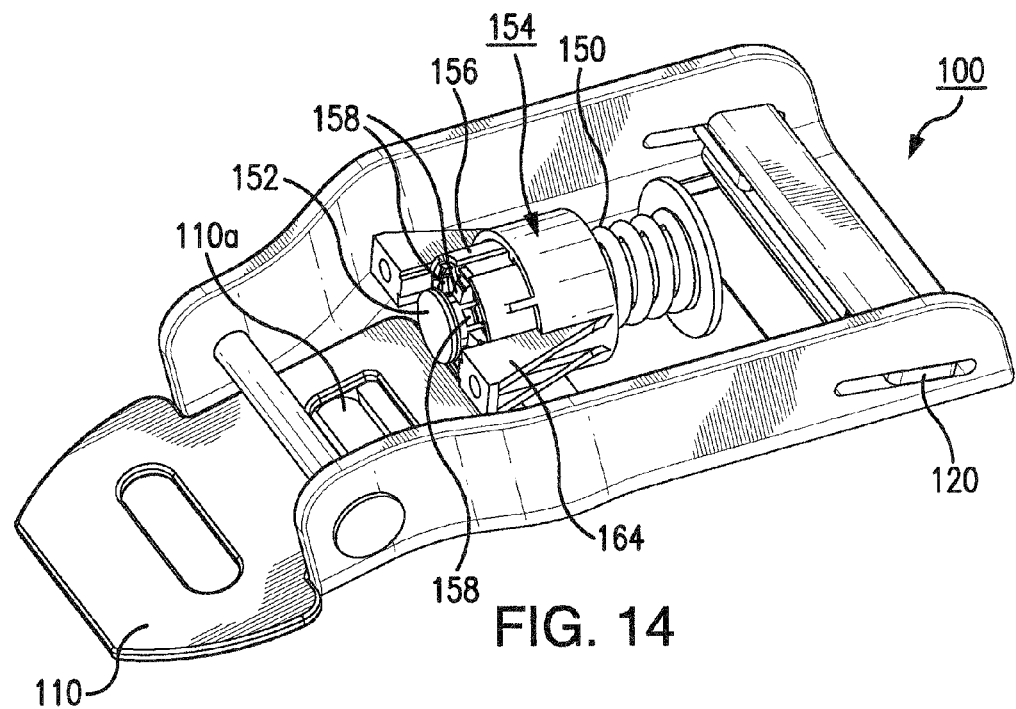
FIG. 14 is a perspective view with the release mechanism removed and showing the bobbin assembly.

The underside of release mechanism 30 is illustrated in FIGS. 6A and 6B. These figures show the manual release aperture 62. A screwdriver, or other suitable implement, can be inserted into the elongated release aperture 62 in order to release tang 26 without triggering the actuator assembly. Likewise, release mechanism 30 includes an indicator 64 and indicator window 66 for viewing the actuator assembly. Indicator 64 can take the form of red and greed colored sleeves to indicate whether actuator assembly has been fired. If the actuator assembly has not been fired it shows the green sleeve (FIG. 6A). Alternatively, after firing, the red sleeve is visible (FIG. 6B).

In the preferred embodiment, the indicator function is achieved by coloring spring housing 47 green and spring 44 red. Prior to the unit being actuated, spring 44 is housed within housing 47. Accordingly, a user looking through indicator window 66 would see the green spring housing 47. This signals that the unit is available for use and has not be activated. As described above, the unit is activated upon being immersed in water. When activated, spring 44 pushes housing 47 forward. Thus, following actuation, the red spring 44 is visible through indicator window 66. This visual indication denotes that the unit has been activated and should not be used. In lieu of a red colored spring 44, it is also possible to include a red cylindrical housing between spring 44 and housing 47. This extra housing would become visible once the unit was activated.

Also, once activated, tang 26 cannot be inserted into buckle 20. This is because once spring 44 moves forward, it holds pawl 32 in the opened configuration, such that tang 26 cannot be locked.

Additional Embodiment

An additional embodiment of the present invention is described in connection with FIGS. 8-14. This alternative restraint system 100 is the same in most respects to the release system 10 as described above. However, system 100 has a thinner profile and is specifically adapted for use as an airline buckle. System 100 includes a conventional aircraft belt connector 110 and a conventional adjuster 120. Adjuster 120 can slide within an associated slot to lock or unlock and adjust the webbing as needed. A spring loaded pawl 130 is similarly included. Pawl 130 operates by lockingly engaging an aperture 110a within belt connector 110, whenever connector 110 is inserted within the housing. Connector 110 can be released either automatically in the presence of water, or by pivoting lever 140 that forms the top of the buckle housing. More specifically, as lever 140 is rotated in the direction "R" (as noted in FIG. 9), the leading edge of lever 140 contacts pawl 130. Continued rotation of lever 140 causes pawl 130 to lift and disengage from aperture 110a. This, in turn, allows connector 110 to be removed from the buckle housing.

The automatic release mechanism is next described. As illustrated, system 100 includes a spring 150 that is positioned about a binding post 152. Binding post 152 includes a bolt and washer 152a. A bobbin assembly 154 is included about the binding post 152 with the bobbin assembly 154 initially keeping spring 150 in compression. More specifically, spring 150 is initially compressed between an outer bobbin housing 164 and the bolt/washer 152a at the end of binding post 152. With spring 150 compressed, the pawl 130 is prevented from rotating so as to release belt connector 110 from buckle housing. Bobbin assembly 154 includes an outer housing 164 that is adapted to slide with respect to an inner housing 156 (note FIG. 13). A series of fingers 158 are positioned about the interior of the inner housing 156. A water dissolvable pill 160 is positioned between housing 156 and fingers 158. Pill 160 in its un-dissolved state operates to keep the fingers 158 from collapsing. While in this configuration, the fingers 158 create a seat for an inner most annular portion 164a of bobbin housing 164. When pill 160 comes into contact with water it dissolves such that the fingers 158 are no longer supported. As a result, spring 150 is released and pushes outer housing 164 over the inner housing 156. Outer housing 164 then contacts pusher bar 162 and forces pusher bar 162 to rotate pawl 130. This, in turn, releases belt connector 110. As noted above, apertures can be formed within housing 164 to control in rate at which water flows into the interior of bobbin 154. This avoids accidental firing of bobbin 154.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

What is claimed is:

1. A system for releasing a passenger restraint in the presence of water, the system comprising:
a first buckle having forward and rearward ends, a fixed tang secured to the rearward end and a releasable tang secured to the forward end, the fixed tang having a first locking aperture, the releasable tang having first and second locking apertures, the first locking aperture of the releasable tang being secured to the passenger restraint;
a release mechanism positioned within the first buckle, the release mechanism including pivotal locking pawl and having a locked orientation wherein the locking pawl engages the second locking aperture and an unlocked orientation wherein the locking pawl is disengaged from the second locking aperture to permit the releasable tang to be removed from the first buckle, a torsion spring for urging the locking pawl into the locked orientation;
an actuator assembly positioned within the first buckle and including a compression spring and a pusher pin, with the compression spring biasing the pusher pin into an extended orientation, the actuator assembly having an actuated state wherein the compression spring is permitted to engage the pusher pin and wherein the pusher pin pivots the locking pawl and brings the release mechanism into the unlocked orientation, the actuator assembly also having an un-actuated state wherein the compression spring remains compressed such that the pusher pin does not pivot the locking pawl, a bobbin that collapses in the presence of water, the bobbing keeping the compression spring biased and the release mechanism in the locked orientation while not in the presence of water, the bobbin collapsing in the presence of water to release the compression spring and actuate the release mechanism;
a second buckle to be releasably secured to the first locking aperture of the fixed tang;
a color indicator for visually signifying whether the actuator assembly has been actuated.

2. The system as described in claim 1 further comprising apertures for regulating the volume of water contacting the bobbin, whereby the release mechanism is only actuated when the system is immersed in water.

3. A system for releasing a passenger restraint in the presence of water, the system comprising:
a buckle having forward and rearward ends, a releasable tang secured to the forward end, the releasable tang having first and second locking apertures, the first locking aperture of the releasable tang being secured to the passenger restraint;
a release mechanism positioned within the buckle, the release mechanism including pivotal locking pawl and having a locked orientation wherein the locking pawl engages the second locking aperture and an unlocked orientation wherein the locking pawl is disengaged from the second locking aperture to permit the releasable tang to be removed from the buckle, a torsion spring for urging the locking pawl into the locked orientation;
an actuator assembly positioned within the buckle and including a compression spring and a pusher pin, with the compression spring biasing the pusher pin into an extended orientation, the actuator assembly having an actuated state wherein the compression spring is permitted to engage the pusher pin and wherein the pusher pin pivots the locking pawl and brings the release mechanism into the unlocked orientation, the actuator assembly also having an un-actuated state wherein the compression spring remains compressed such that the pusher pin does not pivot the locking pawl, a water activated release means operating to keep the compression spring biased and the release mechanism in the locked orientation while not in the presence of water, the water activated release means collapsing in the presence of water to release the compression spring and actuate the release mechanism.

4. The system as described in claim 3 wherein the water activated release means is a bobbin assembly comprising an outer housing with peripherally located fingers and a dissolvable pill positioned within the housing.

5. The system as described in claim 3 wherein the water activated release means is a water dissolvable collar that is initially positioned about the pusher pin and which keeps the compression spring in a biased state until contact with water.

6. The system as described in claim 3 wherein the buckle includes a fixed tang with a first locking aperture.

7. The system as described in claim 5 further comprising a second buckle to be releasably secured to the first locking aperture of the fixed tang.

8. The system as described in claim 3 further comprising a color indicator for visually signifying whether the actuator assembly has been actuated.

9. The system as described in claim 3 wherein the water activated release means comprises a bobbin and an outer bobbin shroud, apertures formed within the outer bobbin shroud for regulating the volume of water entering the bobbin, the apertures controlling the collapse of the water activated release means.

10. A system for releasing a passenger restraint in the presence of water, the system comprising:
a buckle having forward and rearward ends, a releasable tang secured to the forward end;
a release mechanism positioned within the buckle, the release mechanism including a pawl and having a locked state wherein the releasable tang is locked within the buckle by the pawl and an unlocked state wherein the releasable tang can be withdrawn from the buckle;
an actuator assembly positioned within the buckle and including a pusher pin and a spring biasing the pusher pin into an extended orientation, the actuator assembly having an un-actuated state wherein the spring remains compressed and an actuated state wherein the spring is permitted to engage the pusher pin and the pusher pin contacts the pawl, causing the pawl to pivot and bringing the release mechanism into the unlocked state, a water activated release means operating to keep the release mechanism in the locked state while not in the presence of water, the water activated release means collapsing in the presence of water to bring the release mechanism into the unlocked state.

11. The system as described in claim 10 wherein the release mechanism is configured such that the releasable tang can be released from the buckle while under a load.

* * * * *